May 26, 1931.  W. B. VAUGHN  1,807,357
HAY RAKE, GATHERER, LOADER, AND BUNCHER
Filed Nov. 14, 1928   4 Sheets-Sheet 1
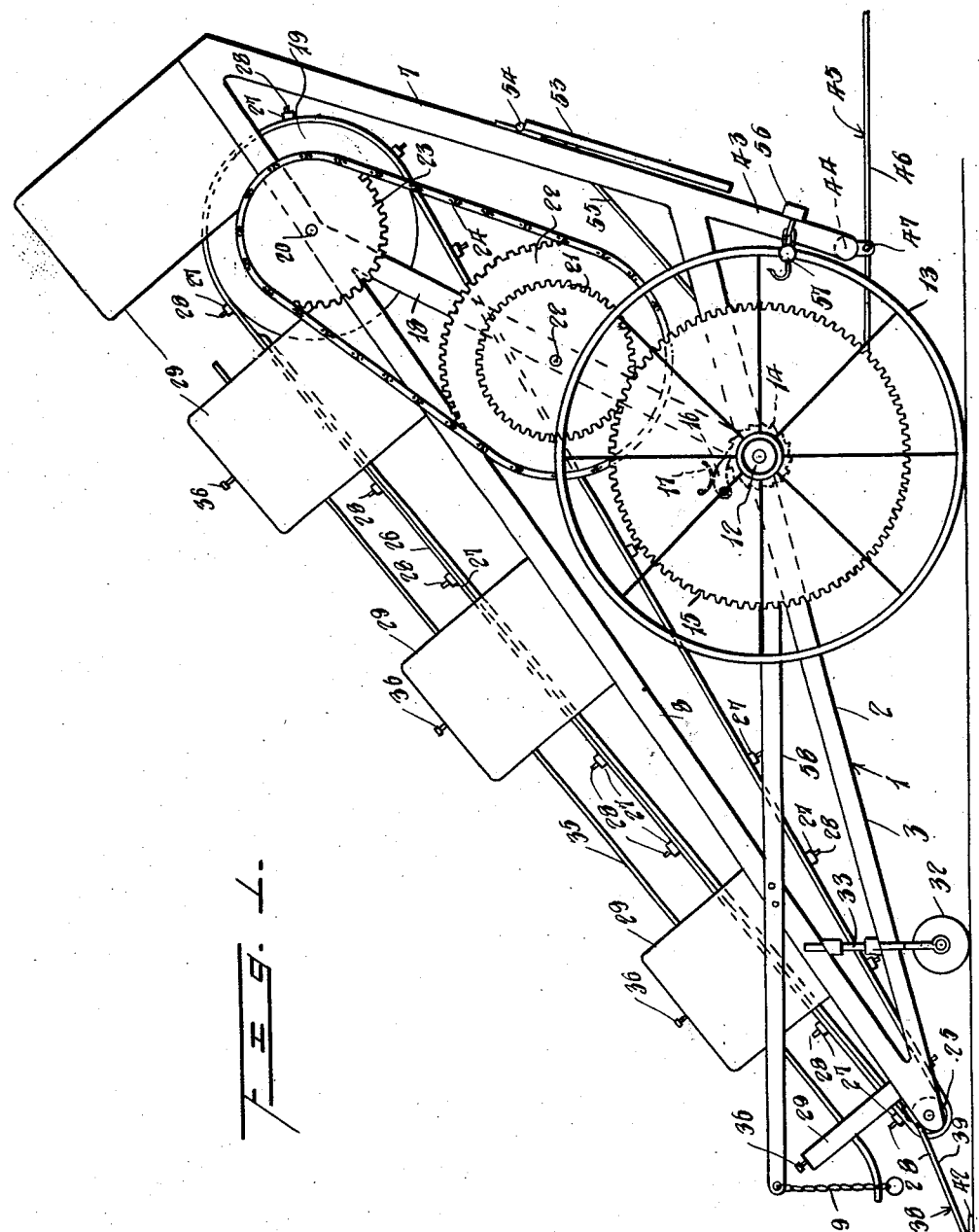
Inventor
W. B. Vaughn.
By [signature]
Attorney

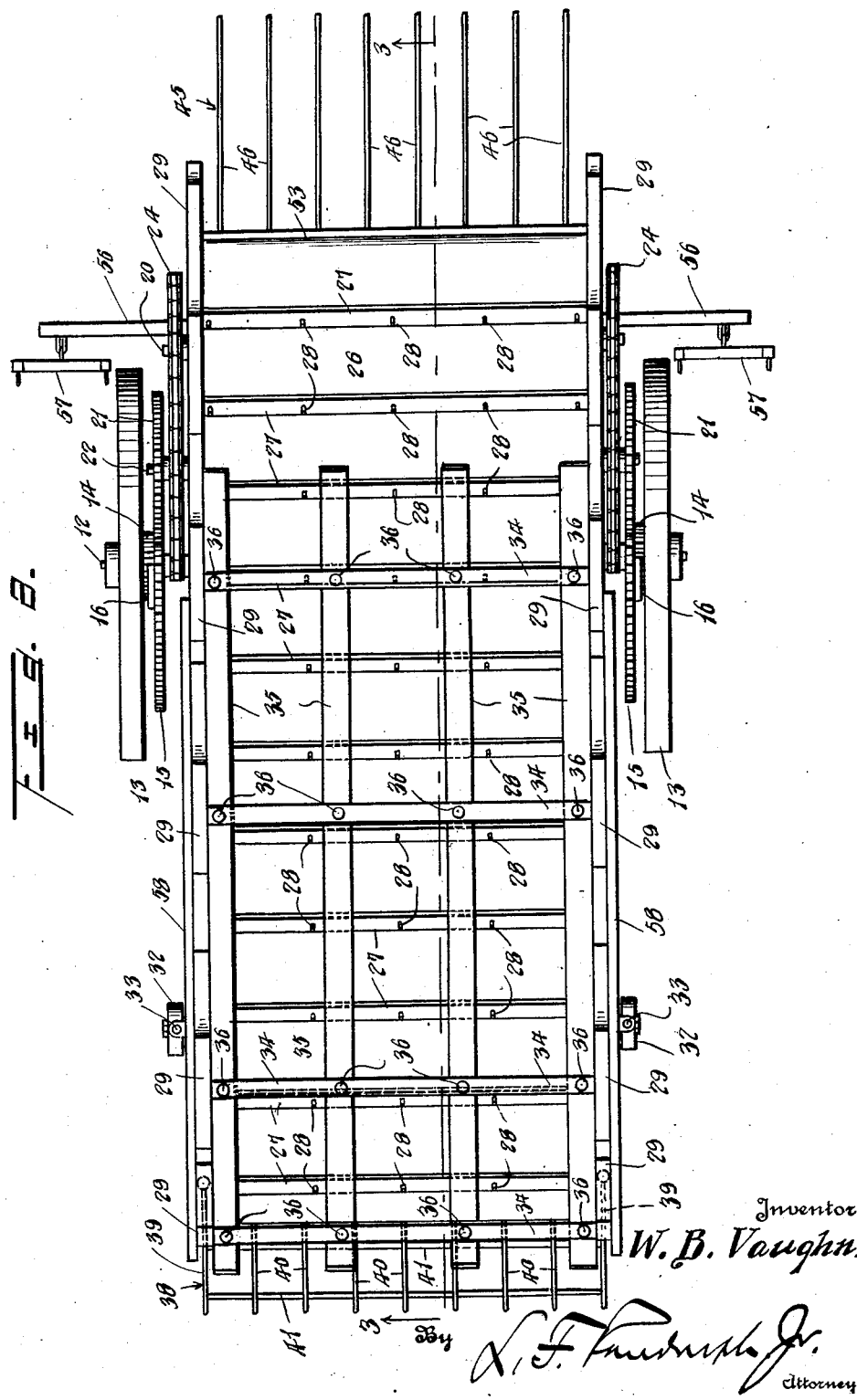

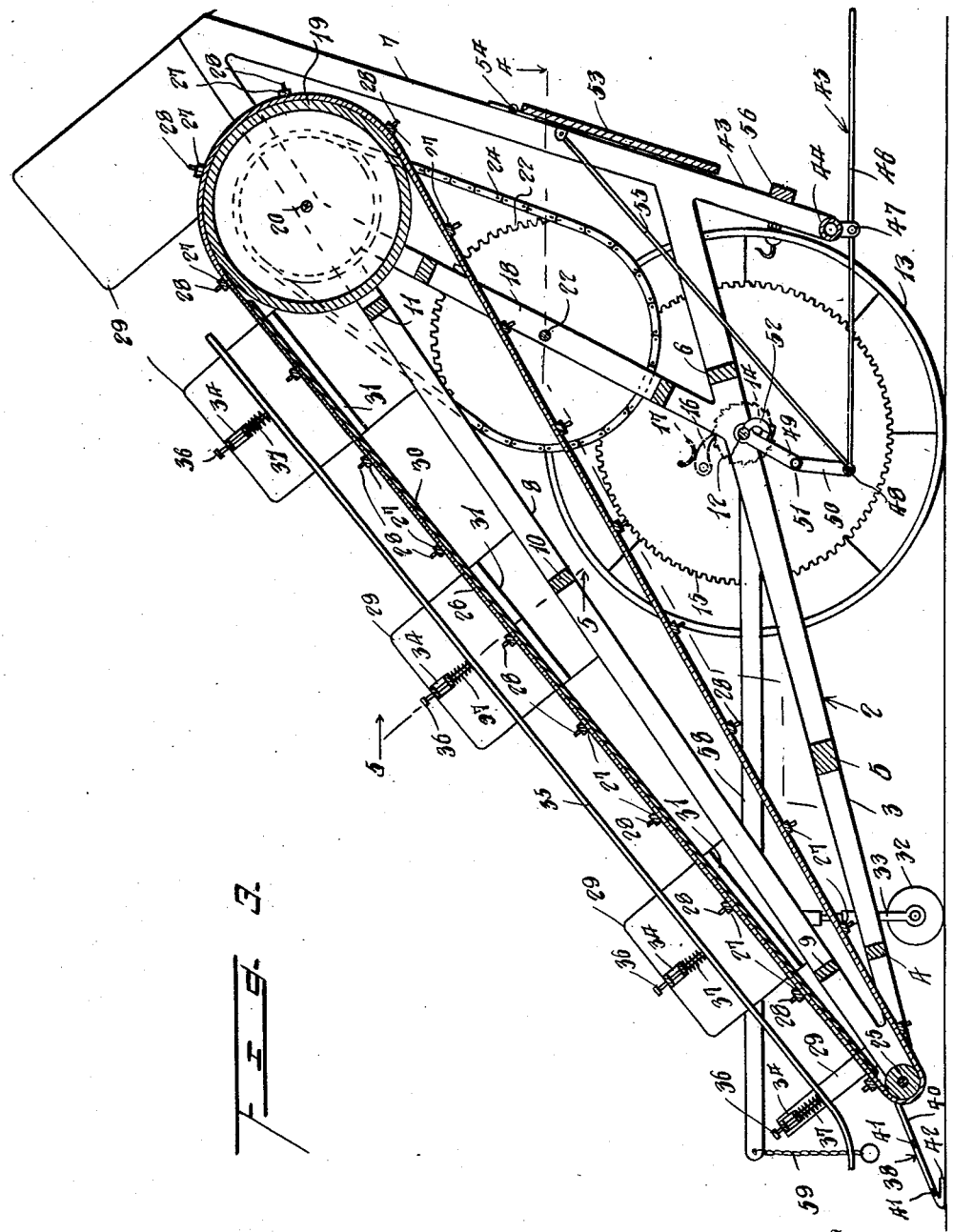

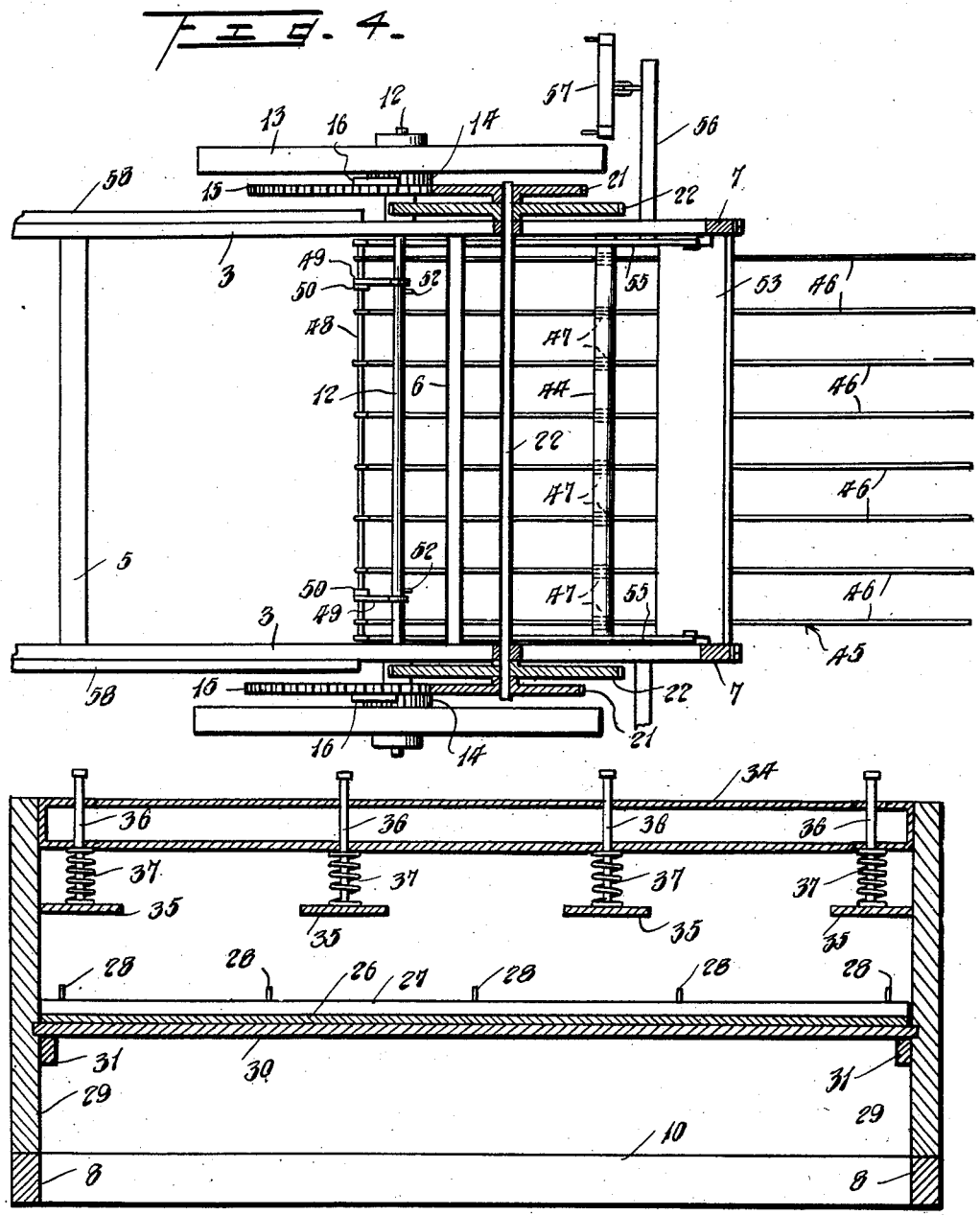

Patented May 26, 1931

1,807,357

UNITED STATES PATENT OFFICE

WILLIAM B. VAUGHN, OF BAKER, OREGON

HAY RAKE, GATHERER, LOADER AND BUNCHER

Application filed November 14, 1928. Serial No. 319,285.

The invention relates to a machine for raking, gathering and loading or gathering and bunching hay and other like crops and has for its principal object the provision of a portable mechanism adapted to be drawn over the ground and provided with means to rake the material and deliver it to a conveyor from whence it may be delivered to a vehicle to be carried from the field or it may be delivered to a bunching mechanism and dumped on the ground in bunches for curing preliminary to stacking or storing it.

A further object of the invention is the provision of a machine of the character stated having an endless conveyor for raising the material and a buncher arranged for delivery thereto from the conveyor and operable to dump automatically when a predetermined weight of material has been deposited on the buncher to leave the material in bunches behind the machine.

The invention will be described hereinafter and will be found illustrated in the accompanying drawings, in which:—

Figure 1 is a side view in elevation of the machine,

Figure 2 is a top plan view,

Figure 3 is a vertical sectional view on a plane indicated by the line 3—3 of Figure 2, Figure 4 is a horizontal sectional view on a plane indicated by the line 4—4 of Figure 3, and Figure 5 is a transverse sectional view on a plane indicated by the line 5—5 of Figure 3.

In the drawings similar reference characters are used to designate corresponding parts thoughout the several views.

The frame of the machine includes spaced upright triangular frames 1 and 2 forming the sides thereof, each of the said frames having a lower bar 3, connected and spaced by transverse bars 4, 5 and 6, a rear bar 7, and a bar 8 connecting the ends of bars 3 and 7, said bars 8 being connected and spaced by transverse bars 9, 10 and 11. An axle 12 is journaled in or on bars 3 and has journaled thereon the ground wheels 13 to which is secured the ratchet wheel 14. Also journaled on the axle 12 are gear wheels 15 on which are pivotally secured pawls 16 that are held engaged with ratchet wheels 14 by means of springs 17. Frame bars 3 and 8 are connected by rearwardly inclined bars 18 to support gearing connecting gear wheels 15 with a drum 19 mounted on shaft 20 journaled in or on bars 8. Said gearing consists of pinions 21 journaled on stub shafts 22 secured to bars 18 and in mesh with gear wheels 15, sprocket wheels 22 secured for rotation with said pinions 21, sprocket wheels 23 secured to shaft 20, and sprocket chains 24 geared to said sprocket wheels 22 and 23. Trained on drum 19 and on drum 25 journaled between the frames 1 and 2 is an endless conveyor apron 26, having transverse seats 27 secured thereto and provided with outwardly projecting pins 28. Secured to the bars 8, at spaced intervals, are upright side members 29, and supported on said side members 29 is a floor plate 30, 31 indicating strips secured to said side members 29 and supporting said floor plate 30, 32 are rollers or casters for supporting the front of the machine, the stems 33 of said castors being adjustable in any suitable manner to raise or lower the front of the machine to accommodate it to the work required. Connecting the side members are cross bars 34 on which are supported presser bars 35 by means of pins 36 slidably engaging said cross bars 34, said presser bars being adapted to compress the material against the apron 26 to insure movement thereof with the apron, the presser bars 35 being held resiliently against the material by means of springs 37 enclosing said pins 36 and terminally engaging the cross bars 34 and the presser bars.

Secured to the bars 8 at the front end of the machine is a gathering member 38 consisting of end fork teeth 39 secured to the bars 8 and intermediate teeth 40, said teeth being held in spaced relation by integral cross bars 41. The free ends of teeth 39 and 40 have rearwardly disposed supporting members 42 that slide on the ground to prevent the ends from engaging therein.

The rear bars 7 are provided with extensions 43 extending downwardly therefrom, and supported on the lower ends of said extension is a cross bar 44. 45 indicates a buncher that consists of a plurality of parallel rods 46, each of which is pivotally mounted by depending ears 47 on cross bar 44. The front ends of said rods 46 are connected by a cross rod 48. The buncher 45 is supported on the axle 12 in the position shown in the drawings by means of articulated links consisting of the sections 49 and 50 pivotally engaging each other at 51, the links 49 pivotally engaging said axle and links 50 the cross rod 48, 52 indicating a stop secured to axle 12 and engaging each link 49 to limit the movement of the links and of the buncher into horizontal position. It will be understood that the material carried by the conveyor apron 26 over the drum 19 will be deposited on the rods 46 at the rear of cross bar 44 and that when the weight of the material is sufficient to overcome the weight of the forward position of said buncher and a member connected therewith, that will be hereinafter described the buncher will be tilted and allow the material to be deposited on the ground. 53 designates a table member consisting of a plate hingedly secured to bars 7 as shown at 54 and connected by means of rods 55 with the ends of cross rod 48, said plate 53 operating as a weight to hold the buncher 45 in horizontal position until a considerable bunch of material is deposited on rods 46, as hereinbefore described, and when the buncher 45 is tilted by the weight of the material, as stated, table 53 will be moved into horizontal position to catch the material therein during the operation of dumping, and when the buncher 45 is relieved of the weight of the bunch of material the weight of the plate in resuming its initial position will return the buncher to its original position and hold it while being reloaded.

Secured transversely of the machine to the extensions 43 is a draft bar 56 having its ends extended and provided with a whiffletree 57 to which a draft animal is hitched at each side of the machine to propel it, 58 indicating a draft pole secured at each side of the machine to the bars 3 and 8 and having a chain or other flexible element, 59 connected to its front end to be secured to the hames or breast strap of the draft animals harness, or it may be connected to the harness bridle. By this management of the draft appliances it will be apparent that the material in windrow or swath may be gathered in advance of the draft animals.

While the invention has been described in connection with the bunching device it will be apparent that the bunching mechanism may be omitted and the material gathered may be deposited directly into a suitable vehicle for transportation from the field, also that the machine may be used entirely for gathering out hay and grain but also for gathering bundles of cut grain and assembling them in convenient numbers of bundles for shocking.

What is claimed is:—

1. A machine of the class described having connected angularly disposed top bars, rear bars and bottom bars forming spaced triangular frames, an intermediate bar extending from the bottom bar to the top bar and forwardly of the rear bar, ground wheels connected to the bottom bars adjacent the junction of the latter with the intermediate bars, a drum journaled on the top bar adjacent the junction thereof with the intermediate bars, a smaller drum journaled at the junction of the top and bottom bars, a conveyor traversing said drums, gearing partly supported on the intermediate bar, being in driving relation to the ground wheel means and to the first mentioned drum, and a plurality of side members extending upwardly from the top bars and being of different height progressively in an upward direction, spring means on said side members, and presser bars supported by the spring means in substantial parallelism with the upper run of the conveyor.

2. A machine of the class described having connected angularly disposed top bars, rear bars and bottom bars forming spaced triangular frames, an intermediate bar extending from the bottom bar to the top bar and forwardly of the rear bar, ground wheels connected to the bottom bars adjacent the junction of the latter with the intermediate bars, a drum journaled on the top bar adjacent the junction thereof with the intermediate bars, a smaller drum journaled at the junction of the top and bottom bars, a conveyor traversing said drums, and gearing partly supported on the intermediate bar, being in driving relation to the ground wheel means and to the first mentioned drum, a buncher mechanism supported on the frame provided with rods, the rear bars having extensions below the bottom bars, and means engaging said extensions and supporting said supporting rods.

In testimony whereof I affix my signature.
WILLIAM B. VAUGHN.